Patented July 21, 1942

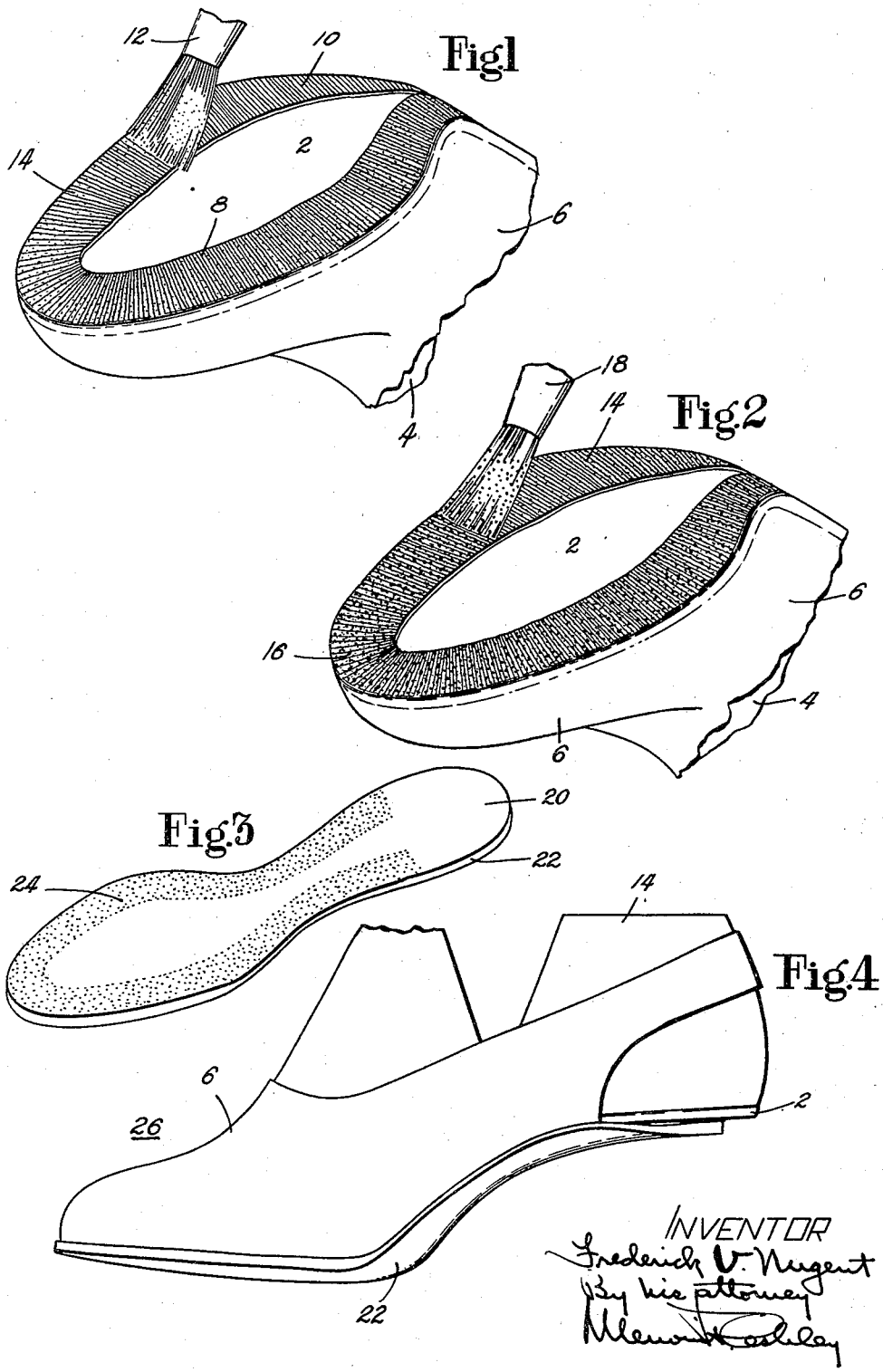

2,290,205

UNITED STATES PATENT OFFICE 2,290,205

SHOE AND METHOD OF ATTACHING OUTSOLES

Frederick V. Nugent, Abington, Mass., assignor to B. B. Chemical Co., Boston, Mass., a corporation of Massachusetts Application July 11, 1941, Serial No. 401,925

3 Claims. (Cl. 12—142)

This invention relates to shoe manufacture, and more particularly to the permanent attachment of outsoles to shoe uppers having an overlasted marginal portion composed of vinyl resin.

Vinyl resin sheet material exhibits attractive possibilities as shoe upper material, but its utilization has involved shoemaking difficulties. Thus, the overlasted marginal portion of the vinyl resin upper does not constitute a satisfactory substance through which to pass stitches in attaching outsoles by a sewing operation, because of the tendency of the vinyl resin sheet to tear between the stitch holes. The disadvantages of using mechanical sole-fastening means such as nails are well known. On the other hand, in attempting to attach outsoles to the overlasted marginal portions of vinyl resin uppers by means of the usual commercial sole-attaching cements, satisfactory adhesion for sole-attaching purposes has not been obtained. This has been the case in attempting to use pyroxylin, rubber cement, latex and polymerized chloroprene to cement leather outsoles to the overlasted marginal portions of vinyl resin shoe uppers.

An object of this invention is to provide an advantageous method of attaching an outsole to a shoe upper having an overlasted marginal portion composed of vinyl resin. A further object is to provide a shoe construction wherein an outsole is securely and adhesively attached to an upper having an overlasted marginal portion composed of vinyl resin.

In the accomplishment of the above and other objects, I have found that an outsole may be adhesively attached to a shoe upper having an overlasted marginal portion composed of vinyl resin by securing a film of chlorinated rubber to said overlasted marginal portion, and securing an outsole to the chlorinated rubber-coated overlasted marginal portion of said upper by means of polymerized chloroprene. The chlorinated rubber film preferably is secured to the upper by roughing said overlasted vinyl resin marginal portion, applying thereto a solution of chlorinated rubber, and permitting said solution to dry. The outsole then may be secured to the upper by applying a liquid dispersion or colloidal solution of polymerized chloroprene to the dried chlorinated rubber on the overlasted marginal portion of the upper, applying a liquid dispersion of polymerized chloroprene to the attaching surface of the outsole, and pressing said outsole and upper together with their polymerized chloroprene-coated surfaces in juxtaposition.

By the present invention a strong attachment of outsole to an upper having an overlasted marginal portion composed of vinyl resin may be obtained adhesively, and without the aid of stitching, nails, or other mechanical fastenings.

In the drawing illustrating a specific embodiment of the invention,

Figure 1 is a fragmentary perspective view showing an upper composed of vinyl resin sheet the overlasted marginal portion of which has been roughed, and illustrating the application of a solution of chlorinated rubber to said marginal portion;

Fig. 2 is a fragmentary perspective view similar to Fig. 1 showing a film of chlorinated rubber secured to the overlasted marginal portion of the vinyl resin upper, and illustrating the application of a dispersion or colloidal solution of polymerized chloroprene to the chlorinated rubber film;

Fig. 3 is a perspective view on a smaller scale of an outsole which is to be attached to the shoe upper, showing polymerized chloroprene adhesive on the marginal portion of the attaching surface of the outsole; and Fig. 4 is an elevation of a shoe in accordance with this invention wherein the outsole has been secured to the chlorinated rubber-coated overlasted marginal portion of the vinyl resin upper by means of polymerized chloroprene.

The shoe upper contemplated by this invention has an overlasted marginal portion composed of vinyl resin. The non-overlasted portion of the upper may consist entirely of vinyl resin or may consist in part of other materials. The vinyl resin may comprise polyvinyl acetate, polyvinyl chloride, a copolymer of vinyl acetate and vinyl chloride, polyvinyl acetal or other suitable vinyl resin. The vinyl resin ordinarily contains a suitable plasticizer, such as dibutyl cellosolve phthalate, or dibutyl sebacate. The outsole contemplated by this invention ordinarily is of leather but it may consist of any other material suitable for the purpose.

A preferred form of chlorinated rubber for use in this invention is that containing about 67% of chlorine and marketed under the trade name "Tornesit" by the Hercules Powder Company, Wilmington, Delaware. For the purposes of this invention the chlorinated rubber may be employed in the form of a solution of Tornesit in a solvent therefor. A suitable solution is one containing 15 to 20% by weight of Tornesit dissolved in a solvent composed of equal parts of methyl ethyl ketone and toluene. The Tornesit itself may have a viscosity characteristic of from 7 to 1000 centipoises. Alternatively, the chlorinated rubber solution may contain dissolved vinyl resin and in such case the solution may contain about 10% by weight of Tornesit together with 10% by weight of low molecular weight vinyl resin all dissolved in equal parts of methyl ethyl ketone and toluene.

The polymerized chloroprene employed for the purposes of this invention is chloroprene (also known as chloro-2-butadiene 1,3) which has been partially polymerized and is plastic in the sense that it may be worked on the rolls of a rubber mill and compounded with other ingredients in a manner similar to that in which crude rubber is treated. Such plastic polymerized chloroprene may be "cured" or "vulcanized" to a condition in which it is elastic rather than plastic and in which condition it resembles vulcanized rubber. This "curing is probably a further polymerization of the partially polymerized chloroprene to a substantially fully polymerized condition rather than the addition of sulphur to the polymer such as is considered to occur in the vulcanization of rubber.

The polymerized chloroprene dispersions or colloidal solutions employed for the purposes of this invention may vary widely in composition but one which I have found very satisfactory is that disclosed in Macdonald Patent 2,163,609 and which is as follows:

| | Grams |
|---|---|
| Plastic polymerized chloroprene (containing 2% phenyl-beta-naphthylamine) | 900 |
| Wood rosin (FF) | 45 |
| Magnesium oxide (light calcined) | 90 |
| Zinc oxide | 45 |
| Phenyl-beta-naphthylamine (stabilizer) | 9 |
| Benzene | 1690 |
| Trichlorethylene | 2850 |
| Sulphur | 27 |
| Du Pont accelerator #808 (butyraldehyde aniline condensation product) | 12 |

A specific example of a preferred manner of carrying out this invention is as follows:

There is provided an insole 2 which has been secured to a last 4. An upper 6 shown as composed of vinyl resin sheet material is lasted over and secured to the insole 2 in any suitable manner. I prefer, however, to employ the lasting method disclosed and claimed in my copending application, Serial No. 401,924, filed on even date herewith.

The vinyl resin overlasted marginal portion 8 is roughed in any suitable manner, as indicated at 10. To the roughed marginal portion 10 is applied, by brush 12 or other suitable applying means, a chlorinated rubber solution such as hereinabove described. This chlorinated rubber solution is permitted to dry in the atmosphere for about an hour, whereby there is deposited upon the vinyl resin marginal portion 8 a continuous marginal film 14 of chlorinated rubber.

Following the securing of the film of chlorinated rubber 14 to the vinyl resin overlasted marginal portion 8, a liquid dispersion or colloidal solution of polymerized chloroprene, such as described above, may be applied by brush 18, or by a machine such, for example, as disclosed in the MacKenzie Patent 2,100,341, on the overlasted marginal portion 8, as indicated at 16 in Fig. 2, over the film of chlorinated rubber 14. Conveniently, the polymerized chloroprene cement 16 on the upper is permitted to dry for about an hour.

To the roughed marginal portion of the flesh or attaching surface 20 of the leather outsole 22 (Fig. 3) there is applied by hand, or by a machine such, for example, as disclosed in Newhall Patent 2,073,647, a liquid dispersion of polymerized chloroprene, such as disclosed above, to form the marginal layer or film 24.

When the polymerized chloroprene cement on the outsole and shoe upper has dried to a tacky stage, which may require a period in the neighborhood of an hour, the outsole 22 and shoe upper 6 may be pressed together with their polymerized chloroprene-coated surfaces in juxtaposition for about a minute or less. The pressing of the sole and upper together under sole-attaching pressure to form a shoe structure 26, as shown in Fig. 4, may be accomplished conveniently in a machine such as shown in Ballard Patent 2,047,185.

When desired, the outsoles may be provided with a coating of polymerized chloroprene cement one or more days in advance of the cementing of the shoe upper, in which case the cement on the outsole may be brought again into adhesive condition in accordance with the process set forth in Wedger Patent 2,087,878.

Having described my invention, what I claim as new and desire to secure by Letters Patent of the United States is:

1. The method of attaching an outsole to a shoe upper having an overlasted marginal portion composed of vinyl resin, which comprises securing thereto a film of chlorinated rubber, and securing an outsole to the chlorinated rubber-coated overlasted marginal portion of said upper by means of polymerized chloroprene.

2. The method of attaching an outsole to a shoe upper having an overlasted marginal portion composed of vinyl resin, which comprises roughing said overlasted vinyl resin marginal portion, applying thereto a solution of chlorinated rubber, permitting said solution to dry, applying a liquid dispersion of polymerized chloroprene to the dried chlorinated rubber on the overlasted marginal portion of the upper, applying a liquid dispersion of polymerized chloroprene to the attaching surface of the outsole, and pressing said outsole and upper together with their polymerized chloroprene-coated surfaces in juxtaposition.

3. In a shoe, an upper having an overlasted marginal portion composed of vinyl resin, a film of chlorinated rubber on said overlasted marginal portion, an outsole, and polymerized chloroprene adhesively securing said outsole to the chlorinated rubber-coated overlasted marginal portion of said shoe upper.

FREDERICK V. NUGENT.